E. J. MANVILLE.
Reversing Gearings for Metal-Planers.
No. 146,539.  Patented Jan. 20, 1874.
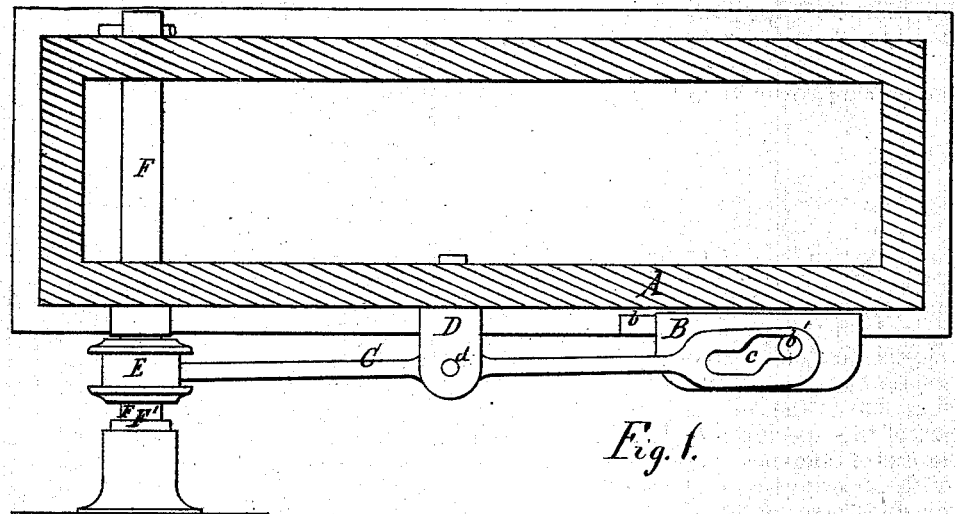
Fig. 1.
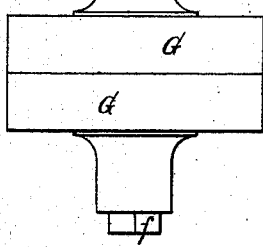
Fig. 2.
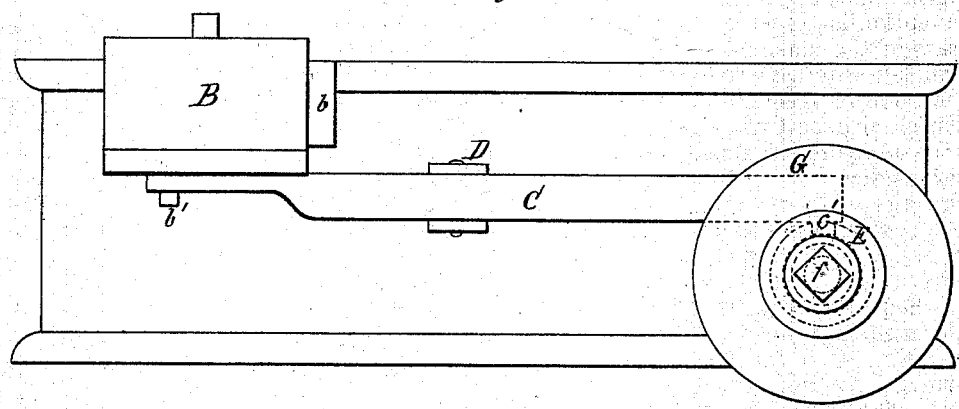
Fig. 3.
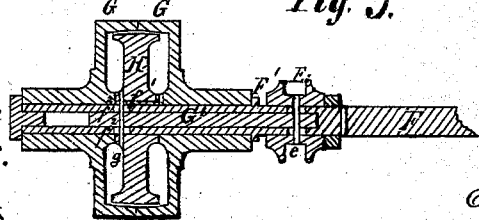
Witnesses.
Chas. B. Steele
J. F. Theodore Lang
Wendell R. Curtis
Inventor.
E. J. Manville,
Chipman Hosmer & Co
Theo. G. Ellis Attys

UNITED STATES PATENT OFFICE.

ELI J. MANVILLE, OF WATERBURY, CONNECTICUT.

IMPROVEMENT IN REVERSING GEARINGS FOR METAL-PLANERS.

Specification forming part of Letters Patent No. 146,539, dated January 20, 1874; application filed July 11, 1873.

*To all whom it may concern:*

Be it known that I, ELI J. MANVILLE, of Waterbury, in the county of New Haven and State of Connecticut, have invented a new and valuable Improvement in Reverse Gears for Planers, &c.; and I do hereby declare that the following is a full, clear, and exact description of the construction and operation of the same, reference being had to the annexed drawings making a part of this specification, and to the letters and figures of reference marked thereon.

Figure 1 of the drawings is a representation of my improved reverse motion by a bottom view. Fig. 2 is a side elevation. Fig. 3 is a detail.

My invention relates to reverse motions with friction-clutches; and it consists of an elastic reverse-lever working a friction-clutch on the main shaft of a planer or other machine depending on reversed motion, between two driving-pulleys, with corresponding friction-bearings running in opposite directions. The object of my invention is to secure safety against breaking parts of the machine by the failure of the friction-clutch to leave the driving-pulley and to secure prompt action in the engagement of the clutch with the reverse-pulley, thereby avoiding the stoppage of the machinery when it is to be reversed.

In the drawings, A represents a planer-bed of ordinary construction, with a sliding reverse-block, B, moving on dovetailed bearings $b$ on the planer-bed. The reverse-block B has a pin, $b'$, attached to it, which moves in an inclined slot, $c$, in the head of an elastic double lever, C, swinging on a fulcrum-pin, $d$, in a slotted bearing, D, which is fastened to the planer-bed A. The end of the lever C is provided with a pin, $c'$, which bears in a groove of a revolving collar, E, on the main shaft F. The collar E is, by aid of a pin, $e$, connected with a sliding rod, G, inside the shaft F, which, for that purpose, is slotted, to allow a longitudinal movement of the parts described on and in the shaft. Two loose pulleys, G, revolving in opposite directions on the shaft F, between the head $f$ of a set-screw and a collar, F', fastened to the main shaft, are so constructed as to entirely inclose a double friction-clutch, H, which has a small longitudinal stroke, and transfers motion from either of the pulleys to the main shaft F by aid of a key, $f^1$. The stroke of the clutch H is effected by the rod G', by means of a pin, $g$, which passes through the said rod and the clutch H, allowance for the stroke being made by two slots, $f^2$, in the main shaft. The inclined slot $c$ in the elastic lever C is, at both ends, continued in a straight direction, to allow the pin $b'$ to travel beyond the reversing part of the slot if the planer-table, by being heavily loaded or moved at a quick speed, should require more time and a longer stroke than usual to spend its inertia.

When the planer is in motion, the thrust-blocks on the planer-table strike the reverse-block B and move it along with the table until the pin $b'$ has come to the end of the inclined slot $c$ and entered the straight part of it. This forces the lever C to the other side and moves the collar E to the opposite end of its stroke; as a consequence, it also moves the friction-clutch to the other pulley, and thereby reverses the revolutions of the main shaft F, while the straight part of the groove $c$ prevents the lever C from working loose and depriving the friction-clutch of the necessary pressure to operate the planer-table.

The construction of my elastic reverse-lever has proved to be the only reliable means of connection between the reverse-block or the planer-table and the friction-clutch, because the yielding property of the lever makes it fit to withstand without injury all manner of thrusts and jerks, and to transfer power to the friction-clutch in a quiet and effective way. There is no shifting of belts, and the consequent speedy destruction of the same, and the planer is free from the noise and filth of intermediate gears and reverse gear-wheels, and by reducing the number of driving and intermediate gears to a practical minimum, the manufacture of planers, or other machines with return stroke, may be rendered very cheap, while the value of the machine is enhanced by its durability and simplicity of construction.

I claim as my invention—

1. The combination of the sliding double friction-clutch H, the sliding rod G' in the hollow shaft F, the grooved collar E, the lever C, and the reverse-block B, substantially as specified.

2. In a planer with friction-clutch, the reverse-lever C with elastic arms and reversing-slot c, and with straight continuations at both ends, for the purpose set forth.

In testimony that I claim the above I have hereunto subscribed my name in the presence of two witnesses.

ELI J. MANVILLE.

Witnesses:
 CHAS. W. GILLETTE,
 R. C. MANVILLE.